B. H. DAULTON.
METHOD OF PRODUCING AUGUR BITS.
APPLICATION FILED FEB. 7, 1921.
1,420,527.
Patented June 20, 1922.
2 SHEETS—SHEET 1.
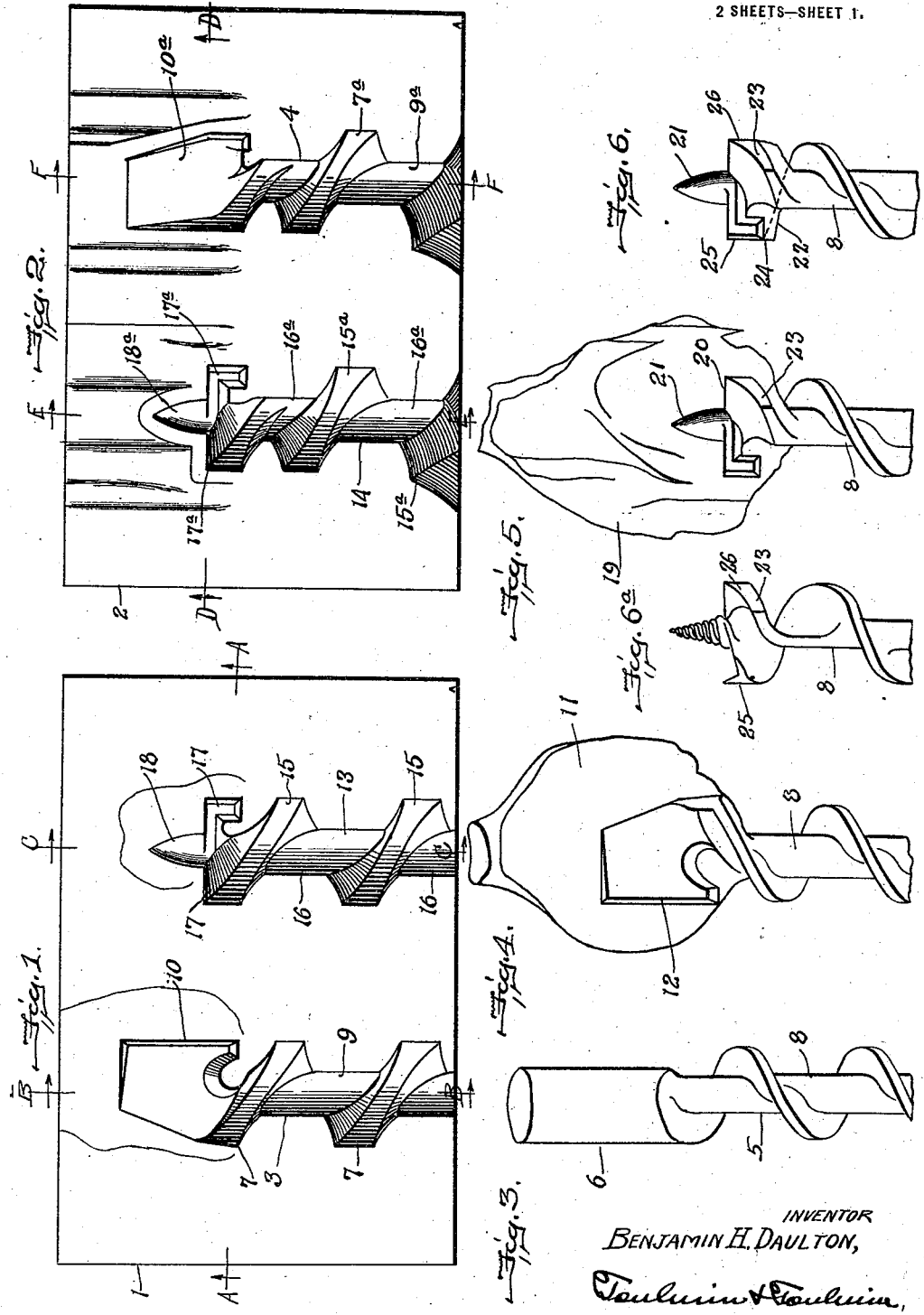
INVENTOR
BENJAMIN H. DAULTON,
ATTORNEYS B. H. DAULTON.
METHOD OF PRODUCING AUGUR BITS.
APPLICATION FILED FEB. 7, 1921.
1,420,527.
Patented June 20, 1922.
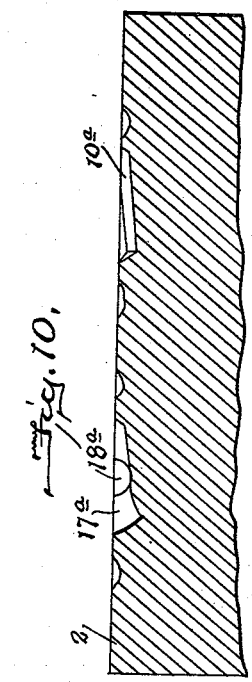
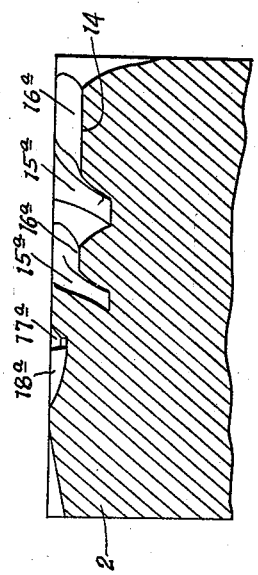
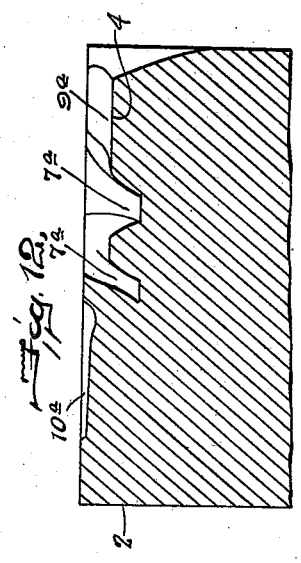
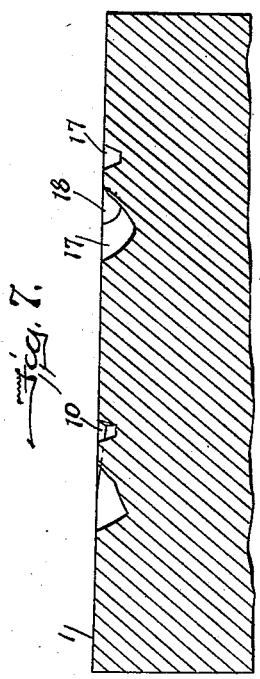
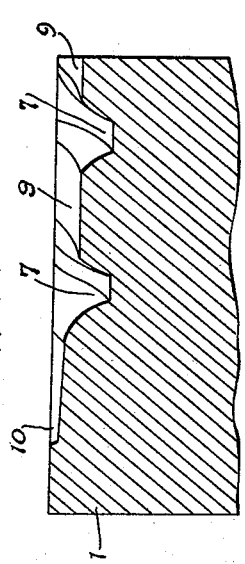
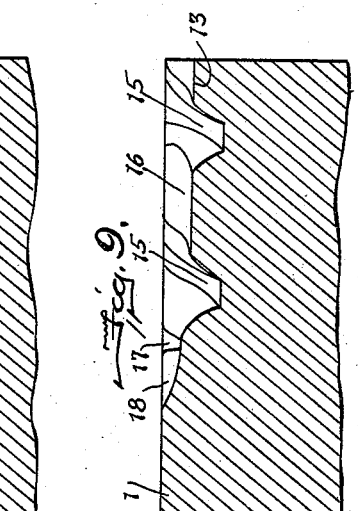
INVENTOR
BENJAMIN H. DAULTON,
ATTORNEYS

UNITED STATES PATENT OFFICE.

BENJAMIN H. DAULTON, OF WILMINGTON, OHIO, ASSIGNOR TO THE IRWIN AUGER BIT COMPANY, OF WILMINGTON, OHIO, A CORPORATION OF OHIO.

METHOD OF PRODUCING AUGER BITS.

1,420,527.  Specification of Letters Patent. Patented June 20, 1922.

Application filed February 7, 1921. Serial No. 442,898.

*To all whom it may concern:*

Be it known that I, BENJAMIN H. DAULTON, a citizen of the United States, residing at Wilmington, in the county of Clinton and State of Ohio, have invented certain new and useful Improvements in Methods of Producing Auger Bits, the specification of which was filed with my application for patent on the 7th day of February, 1921, Ser. No. 442,898.

This invention relates to an improved method of producing auger bits. Its prime objects are to eliminate such old steps in this art in the production of bits as, for instance, the upsetting or longitudinal compression of that part of the blank which is used for ultimately making the cutting end of the bit; to eliminate a shearing action to remove a part of the surplus metal from the blank stock in the case of such bits as are of one inch or less in diameter; and to produce the bits essentially by two die operations, one shearing operation (in the case of bits of an inch or less in diameter) and two shearing operations (in the case of bits above an inch in diameter), and a final milling operation.

In the accompanying drawings, which illustrate a set of dies constituting one means for carrying our method into effect:

Fig. 1 is a plan view of one die member showing the die-configuration for the first and second operations;

Fig. 2 is a like view of the other die member showing the corresponding die-configurations;

Fig. 3 a view of the raw stock ready for the first step of treatment in the method;

Fig. 4 is a view of the stock after the first operation;

Fig. 5 is a view of the stock after the second operation;

Fig. 6 is a view of the bit in the rough after the second operation and ready for the finishing step comprised in the milling operation;

Fig. 6ª is a view of the finished product;

Fig. 7 is a transverse sectional view of one die member on the line A—A of Fig. 1;

Fig. 8 is a sectional view of the die member on the line B—B of Fig. 1;

Fig. 9 is a sectional view of the die member on the line C—C of Fig. 1;

Fig. 10 is a sectional view on the line D—D of the other die member shown in Fig. 2;

Fig. 11 is a sectional view on the line E—E of the same die member shown in Fig. 2; and Fig. 12 is a sectional view on the line F—F of this same die member shown in Fig. 2.

I will now set forth my improved method for the production of auger bits and in doing so will make concurrent reference to these die instrumentalities as one means I have selected for carrying the method into practical effect.

The numerals 1 and 2 designate two blocks of metal constituting a pair of dies, each die being fashioned with the proper die-configurations. In the die 1, one-half of the configurations are shown generally at 3 and in the die 2 the other half and corresponding configurations are shown generally at 4. When the member 2 is brought down upon the member 1 the configurations 4 will match with and overlie the configurations 3. When this is being done the lower side of the raw stock shown in Fig. 3 will lie on and in the configurations 3, while the upper side of this raw stock will enter the configurations 4 as the die member 2 comes down upon the die member 1. This stock comprises a part 5 of the ultimate bit, which part has been formed by any of the usual or approved modes and also comprises the bar or head 6 fashioned in any convenient way.

This stock, 5—6, is laid with its spiral in the spiral die cavities 7 and its core 8 in the core cavities 9, the head 6 generally overlying the head cavity 10 of the die.

In this situation the die member 2, by suitable mechanism, is brought down upon the die member 1 so that the corresponding cavities 7ª, 9ª and 10ª match the corresponding cavities 7, 9, and 10 on the lower die, and so that these cavities 7ª, 9ª and 10ª in the upper die receive the stock 5, 6 and 8 as these parts of the stock enter the die. The raw stock is, of course, in a state of high heat at this time.

The result of this first step in the method is to convert the head 6 into the condition of partial production shown in Fig. 4, in which the surplus metal has assumed the form of a fin 11 with the bit-head in the form shown at 12, this bit-head being the product of the combined cavities 10 and 10ª.

In the case of bits of one inch in diameter or less the quantity of metal in the fin 11, resulting from the surplus metal in the head 6, is not sufficient to need clipping off or removal before the next operation in the dies. But in the case of heads 6 large enough to make bits more than an inch in diameter the surplus metal in the resulting fin 11 will be such that it must be removed before the second operation. This removal step is usually performed by a shearing operation, by which the fin 11 is sheared from the head or body portion 12. In either case the second operation is now performed by placing the partially completed product shown in Fig. 4 in the die cavities generally shown at 13 in Fig. 1 and 14 in Fig. 2. This step is accomplished in the same manner as was the first die operation or step, that is to say, the product shown in Fig. 4 is laid on and in the die member 1 and its cavities 13 so that the spirals will lie in the die cavities 15, the core in the die cavities 16 and the head 12 over the head and point cavities 17 and 18. Then when the die member 2 is brought down upon the die member 1 the spiral cavities 15ª will receive the upper portions of the spirals of the stock, the core cavities 16ª the upper portion of the core of the stock and the head cavities 17ª and point cavities 18ª will be over the upper portion of the head 12 of the stock.

When the blow or pressure is applied to the upper die member the stock, now in the form shown in Fig. 4, will be converted or transformed into the form and condition shown in Fig. 5, in which the surplus material is shown at 19, the head of the bit at 20 and the point at 21.

The next step in the method is the removal of the surplus or web 19 which is done by a shearing operation performed by any suitable instrumentalities. When this is done the product shown in Fig. 6 will have been arrived at and ready for the finishing operations. I say "product" because the article shown in Fig. 6 is the bit which results from the several steps of the method I have set forth. There remain the milling operation to remove the thin fin 22 and to generally finish off the spirals on the core and the threading operation to cut a thread on the point 21. But the final product will look just like that shown in Fig. 6ª with the fin 22 removed and the threads applied to the point.

It will not be seen, by way of résumé, that my improved method consists, essentially, of these steps: (*a*) the production of the raw stock substantially as shown in Fig. 3, with a body or head 6; (*b*) a die operation by which this head is converted into a preliminary bit-head 12 and a fin of surplus material 11; (*c*) the removal of this fin in the case of bits more than one inch in diameter and its non-removal in the case of bits of one inch and less in diameter; (*d*) a second die operation on the article shown in Fig. 4, with or without the fin by which the bit-head and point are formed and brought to the state shown in Fig. 5; and (*e*) the removal of the surplus fin left after this second die operation to produce the product shown in Fig. 6, in which the bit-head and bit point have been duly formed in proper configuration and proper relation with the spirals and core of the original raw stock illustrated in Fig. 3.

My method is expeditious and certain in operation and results. The product is strong and durable by reason of the method above described, by reason of the solidifying effect of the treatment of the material, and is symmetrical and true. And it will be observed that not only is the point 21 and the cutting head 20 formed from the bar 6 of the raw stock, but that, as seen in Figs. 5 and 6, the head, in the type of bit illustrated, has a "short side" 23, being a short spiral section opposite that member of the spiral which terminates at the point 24, as shown by the dotted lines, where it joins with what might be called the left hand side 25 of the head corresponding with the "short side" or what might be called the right hand side 26 of the head. So that the spiral of the raw stock blends with one side of the bit head and a "short side" is formed to constitute the other side of the bit-head, as well as the point, by the practice of my method.

Referring to Figs. 7 to 12 inclusive, the particular character of the die configurations will be more fully seen and understood, a comparison of the reference numerals in Figs. 1 and 2 with those in Figs. 7 to 12 making this matter perfectly plain.

Having thus fully described my invention, what I claim as new and desire to secure by Letters Patent, is:—

1. The herein described method of making auger bits comprising producing raw stock with a head and spirals; treating this head to a die operation to partially form the bit-head in the fashion of a plate-like piece with the surplus material reduced to a web; in subjecting this partial product to another die operation and forming the bit-head and point from the plate-like stock, the surplus material going into a web; and in removing this web.

2. The herein described method of making auger bits comprising producing raw stock with a head and spirals; treating this head to a die operation to partially form the bit-head in the fashion of a plate-like piece with the surplus material reduced to a web; in removing this surplus material; in subjecting this partial product to another die operation and forming the bit-head and point from the plate-like stock, the surplus material going into a web; and in removing this web.

3. The herein described method of making auger bits comprising producing raw stock with a head and spirals; treating this head to a die operation to partially form the bit-head in the fashion of a plate-like piece with the surplus material reduced to a web; in subjecting this partial product to another die operation and forming the bit-head and point from the plate-like stock, the surplus material going into a web; in removing this web; and in a milling operation to remove a final web and to properly shape the remainder of the bit-head on the long or spiral side and on the short side.

4. The herein described method of forming auger bits consisting in producing raw stock comprising a core, spirals and a head; in placing this stock in a die member having die cavities corresponding with the core and spirals of the stock and a head cavity to receive and permit the overflow of the head of the stock; in bringing a corresponding die member forcibly upon the stock while resting in the first die member; in subjecting this partial product to a second and similar die operation to convert the partial bit-head in the first die operation into a complete bit-head and point with one side of the head blended with the original spiral and the other formed of a "short side;" in a trimming operation after the second die operation; and in a milling step after this trimming operation.

In testimony whereof I affix my signature.

BENJAMIN H. DAULTON.